US011297919B1

(12) United States Patent
Piper

(10) Patent No.: US 11,297,919 B1
(45) Date of Patent: Apr. 12, 2022

(54) CASE FOR PORTABLE ELECTRONIC COMPUTING DEVICE

(71) Applicant: Pioneer Square Brands, Inc., Seattle, WA (US)

(72) Inventor: Brian Lewis Piper, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/503,239

(22) Filed: Oct. 15, 2021

Related U.S. Application Data

(60) Provisional application No. 63/192,018, filed on May 22, 2021.

(51) Int. Cl.
| *A45C 11/00* | (2006.01) |
| *G06F 1/16* | (2006.01) |
| *A45C 13/00* | (2006.01) |

(52) U.S. Cl.
CPC ............ *A45C 11/00* (2013.01); *A45C 13/005* (2013.01); *G06F 1/1616* (2013.01); *A45C 2011/003* (2013.01)

(58) Field of Classification Search
CPC .............. A45C 11/00; A45C 2011/003; A45C 2011/002; A45C 13/005

USPC ......................................................... 206/320
See application file for complete search history.

(56) References Cited

U.S. PATENT DOCUMENTS

| 5,028,075 | A | * | 7/1991 | Donnelly | B42F 9/00 281/49 |
| D510,348 | S | * | 10/2005 | Kaczowka | D14/341 |
| 7,672,117 | B1 | * | 3/2010 | Gary | G06F 1/1616 361/679.01 |
| 9,489,020 | B2 | * | 11/2016 | Ahee | G06F 1/1626 |
| 2006/0060485 | A1 | * | 3/2006 | Picot | A45C 5/00 206/320 |
| 2006/0226040 | A1 | * | 10/2006 | Medina | G06F 1/1616 206/320 |
| 2007/0227923 | A1 | * | 10/2007 | Kidakarn | G06F 1/1681 206/320 |
| 2008/0308437 | A1 | * | 12/2008 | Lin | G06F 1/1616 206/320 |

* cited by examiner

*Primary Examiner* — Steven A. Reynolds
(74) *Attorney, Agent, or Firm* — Grandview Law

(57) ABSTRACT

Systems and methods are involved for a portable electronic computing device the system includes (I) a first case section to receive a first device portion, (II) a second case section to receive a second device portion, and (III) a spine member being coupled to the first case section, the spine member being coupled to the second case section, the spine member including at least one elongated opening extending generally parallel with a side of the first case section.

15 Claims, 15 Drawing Sheets

CASE FOR PORTABLE ELECTRONIC COMPUTING DEVICE

SUMMARY

In one or more aspects, a system can include a system for a portable electronic computing device, the portable electronic computing device including a first device portion, and a second device portion, wherein the first device portion being at least one of the following: hingedly couplable with the second device portion and separately uncouplable from the second device portion, the system including (I) a first case section including (A) a base including at least one interior surface, (B) a first side including at least one first wall portion with the at least one first wall portion extending perpendicularly to the at least one interior surface, (C) a second side including at least one second wall portion with the at least one second wall portion extending perpendicularly to the at least one interior surface, and (D) a third side including at least one third wall portion with the at least one third wall portion extending perpendicularly to the at least one interior surface, wherein the at least one first wall portion extends perpendicularly to the second wall portion, and wherein the at least one first wall portion extends parallel with the at least one third wall portion such that the first case section being configured to receive the first device portion of the portable electronic computing device; (II) a second case section including (A) a base including at least one interior surface, (B) a first side including a at least one first wall portion with the at least one first wall portion extending perpendicularly to the at least one interior surface, (C) a second side including a at least one second wall portion with the at least one second wall portion extending perpendicularly to the at least one interior surface, and (D) a third side including a at least one third wall portion with the at least one third wall portion extending perpendicularly to the at least one interior surface, wherein the at least one first wall portion extends perpendicularly to the second wall portion, and wherein the at least one first wall portion extends parallel with the at least one third wall portion such that the second case section being configured to receive the second device portion of the portable electronic computing device; and (III) a spine member being coupled to the first case section, the spine member being coupled to the second case section, the spine member including at least one elongated opening extending generally parallel with a linear dimension, the linear dimension being generally parallel with the at least one second wall portion. Wherein the at least one elongated opening of the spine member includes a first elongated opening and a second elongated opening, an elongated spine member portion therebetween, the first elongated opening, the second elongated opening, and the elongated spine member portion extending generally parallel to the linear dimension. Wherein the first case portion, the second case portion, and the spine member being of at least one molded material structure. Wherein the first case portion being of at least one first material substance, the second case portion being of the at least one first material substance, and the spine member being of at least one second material substance, the first case portion, the second case portion, and the spine member being formed by co-molding. Wherein the first case portion being of at least one first material substance, the second case portion being of the at least one first material substance, and the spine member being of at least one second material substance. Wherein the spine member being made from material to allow for change in width of at least one portion of the at least one elongated opening. Wherein the spine member includes at least one interior surface, wherein a first configuration of the system includes the at least one interior surface of the base of the first case section, the at least one interior surface of the base of the second case section, and the at least one interior surface of the spine member being planarly parallel with each other, and wherein the first configuration of the system includes a width of the at least one portion of the at least one elongated opening being generally consistent along the at least one portion of the at least one elongated opening. Wherein the spine member includes at least one first width and the at least one elongated opening includes at least one second width, the at least one first width being greater than the at least one second width. Wherein the spine member includes at least one first width and the at least one elongated opening includes at least one second width, the at least one first width being smaller than the at least one second width. Wherein the spine member including at least one portion extending between the first case section and the second case section, wherein the at least one portion of the spine member extending along the linear dimension a first length, and wherein includes a least a portion of the at least one elongated opening extending generally parallel with the linear dimension a second length, the second length being at least half of the first length. Wherein the spine member includes a first loop and a second loop, the at least one elongated opening positioned therebetween. Wherein the at least one elongated opening has first and second sides extending generally parallel with the linear dimension, the first side including a first length and the second side including a second length, the first length being greater than the second length. Wherein the spine member includes a first surface portion and a second surface portion, wherein the first surface portion of the spine member being in contact with at least a portion of one of the at least one interior surface of the first case section, and wherein the second surface portion of the spine member being in contact with at least a portion of one of the at least one interior surface of the second case section. Wherein the spine member includes at least one fabric-based material. Wherein at least one portion of the spine member is made of a flexible synthetic material selected from a list including but not limited to metalized material, acrylonitrile material (ABS), low density polyethylene (LDPE) material, flexible plastic material, polyvinyl chloride material, thermoplastic polyurethane material, and silicone material. Wherein at least one portion of the first case section and at least one portion of the second case section are made of a hard material selected from a list including but not limited to high-density polyethylene (HDPE) plastic.

In one or more aspects, a system for a portable electronic computing device, the portable electronic computing device including a first device portion, and a second device portion, wherein the first device portion being at least one of the following: hingedly couplable with the second device portion and separately uncouplable from the second device portion, the system including (I) a first case section including a first side, a second side, and a third side, the first section being configured to receive the first device portion of the portable electronic computing device; (II) a second case section being configured to receive the second device portion of the portable electronic computing device; and (III) a spine member being coupled to the first case section, the spine member being coupled to the second case section, the spine member including at least one elongated opening extending generally parallel with a linear dimension, the linear dimension being generally parallel with the second side of the first case section.

In one or more aspects, a system for a portable electronic computing device, the portable electronic computing device including a first device portion, and a second device portion, wherein the first device portion being at least one of the following: hingedly couplable with the second device portion and separately uncouplable from the second device portion, the system including (I) a first case section including a first side, a second side, and a third side, the first section being configured to receive the first device portion of the portable electronic computing device; (II) a second case section being configured to receive the second device portion of the portable electronic computing device; (III) a spine member being coupled to the first case section, the spine member being coupled to the second case section, at least a portion of the spine member extending between the first case section and the second case section; and (IV) a handle coupled to another portion of the system other than the spine member. Wherein the first case section is configured to receive the first device portion of the portable electronic computing device as including a display portion, and the handle is being coupled to the first case section. Wherein the second case section is configured to receive the second device portion of the portable electronic computing device as including a keyboard portion, and the handle is being coupled to the first case section.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of a case for portable electronic computing device systems, articles of manufacture, compositions of matter for same that may provide context, for instance, in introducing one or more processes and/or devices described herein.

DETAILED DESCRIPTION

Figure 1:
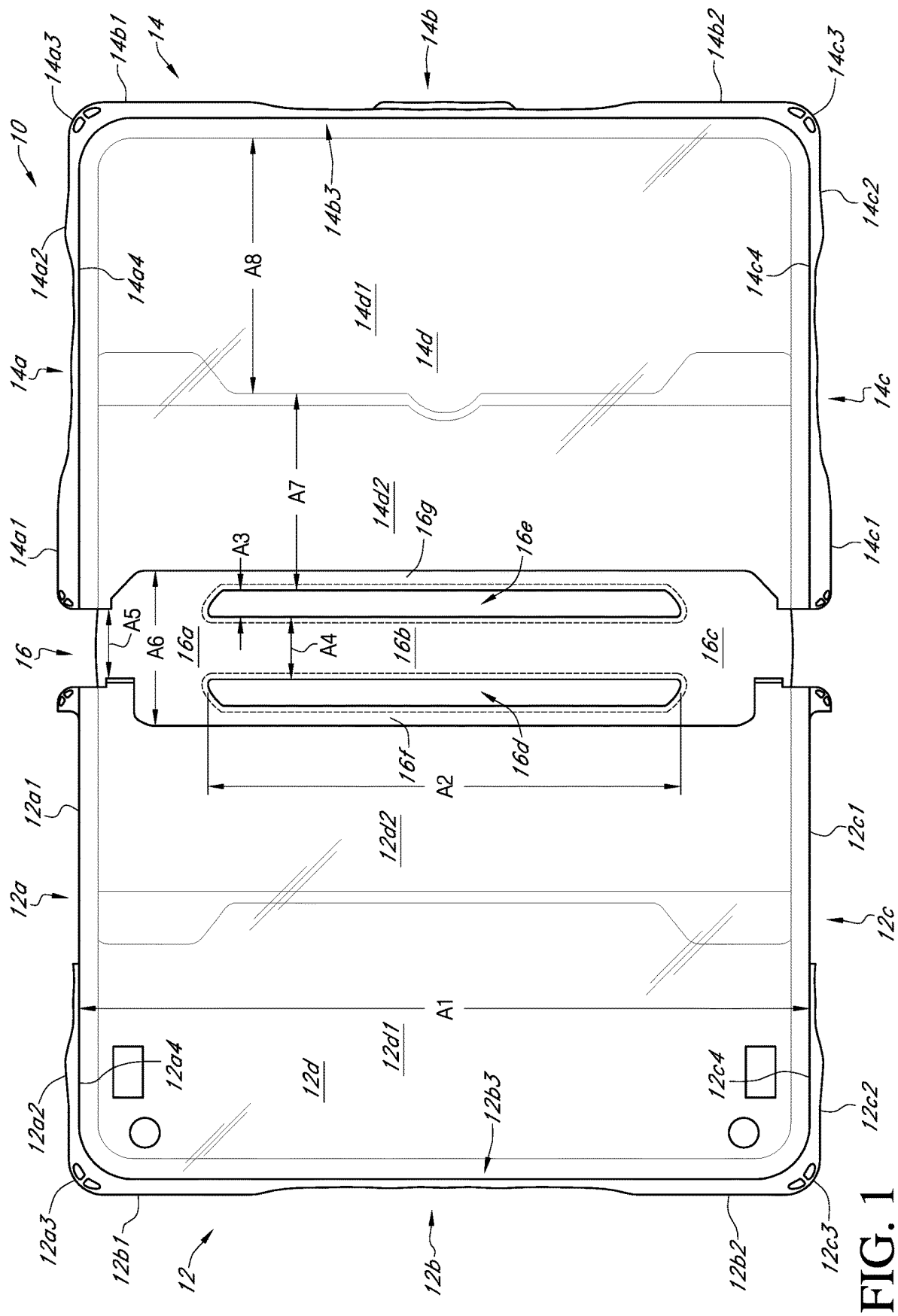
FIG. 1 is an anterior plan view of device case assembly in flat-open configuration including spine member, first case section, and second case section for portable electronic computing device with spine member coupled to first case section and second case member.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an anterior plan view of device case assembly in flat-open configuration including spine member, first case section, and second case section for portable electronic computing device with spine member coupled to first case section and second case member. In implementations, device case assembly 10 is shown to include first case section 12, second case section 14, and spine member 16.

In implementations, first case section 12 is shown to include side 12a, side 12b side 12b, side 12c, and base 12d. In implementations, side 12a is shown to include device access 12a1, exterior portion 12a2, exterior portion 12a3, and wall 12a4. In implementations, side 12b is shown to include exterior portion 12b1, exterior portion 12b2, and wall 12b3. In implementations, side 12c is shown to include device access 12c1, exterior portion 12c2, exterior portion 12c3, and wall 12c4. In implementations, base 12d is shown to include uncovered base portion 12d1.

In implementations, second case section 14 is shown to include side 14a, side 14b, side 14c, and base 14d. In implementations, side 14a is shown to include exterior portion 14a1, exterior portion 14a2, exterior portion 14a3, and wall 14a4. In implementations, side 14b is shown to include exterior portion 14b1, exterior portion 14b2, and wall 14b3. In implementations, side 14c is shown to include exterior portion 14c1, exterior portion 14c2, exterior portion 14c3, and wall 14c4. In implementations, base 14d is shown to include uncovered base portion 14d1.

In implementations, spine member 16 is shown to include spine portion 16a, spine portion 16b, spine portion 16c, elongated opening 16d, elongated opening 16e, spine portion 16f, and spine portion 16g.

In implementations, device case assembly 10 is shown to include linear dimension A1, linear dimension A2, linear dimension A3, linear dimension A4, linear dimension A5, linear dimension A6, linear dimension A7, and linear dimension A8.

Figure 2:
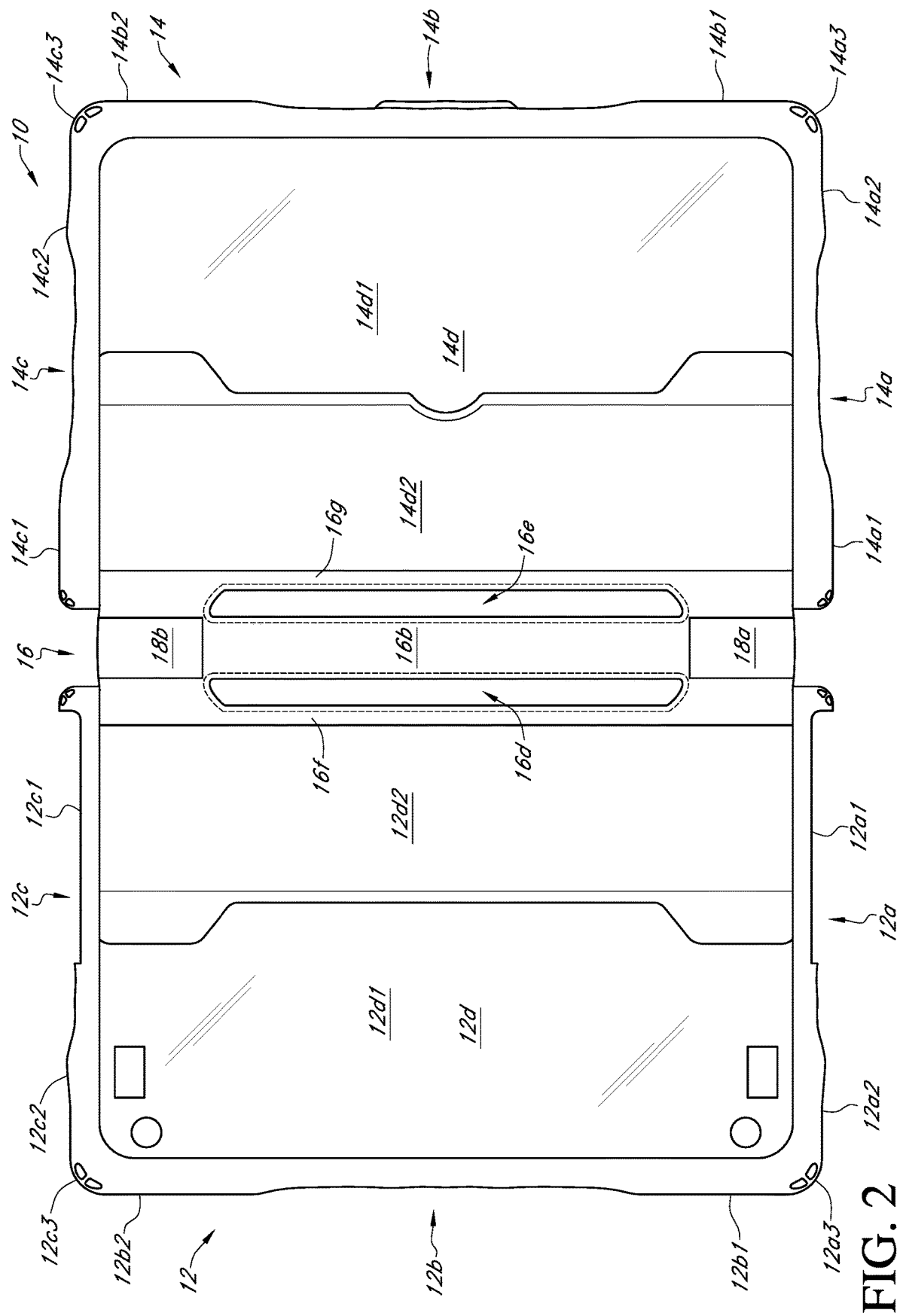
FIG. 2 is a posterior plan view of device case assembly of FIG. 1 in flat-open configuration.

Turning to FIG. 2, depicted therein is a posterior plan view of device case assembly of FIG. 1 in flat-open configuration. In implementations, spine member 16 is shown to include spine portion 16h, and spine portion 16i. In implementations, device case assembly 10 is shown to include loop 18a, and loop 18b.

Figure 3:
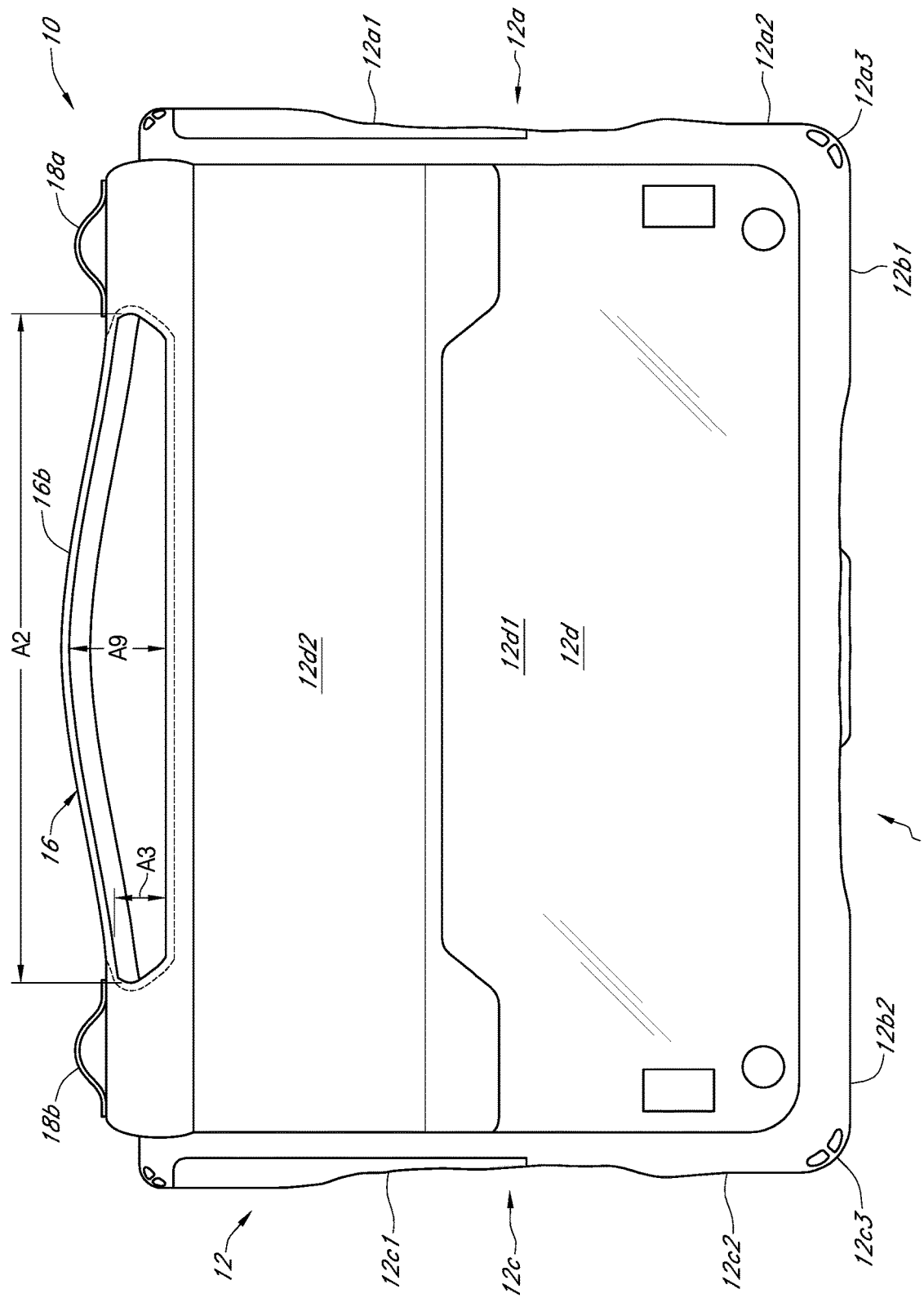
FIG. 3 is a rear side-elevational view of device case assembly of FIG. 1 in closed configuration.

Turning to FIG. 3, depicted therein is a rear side-elevational view of device case assembly of FIG. 1 in closed configuration. In implementations, device case assembly 10 is shown to include linear dimension A9. In implementations, spine member 16 is shown to include spine portion 16h.

Figure 4:
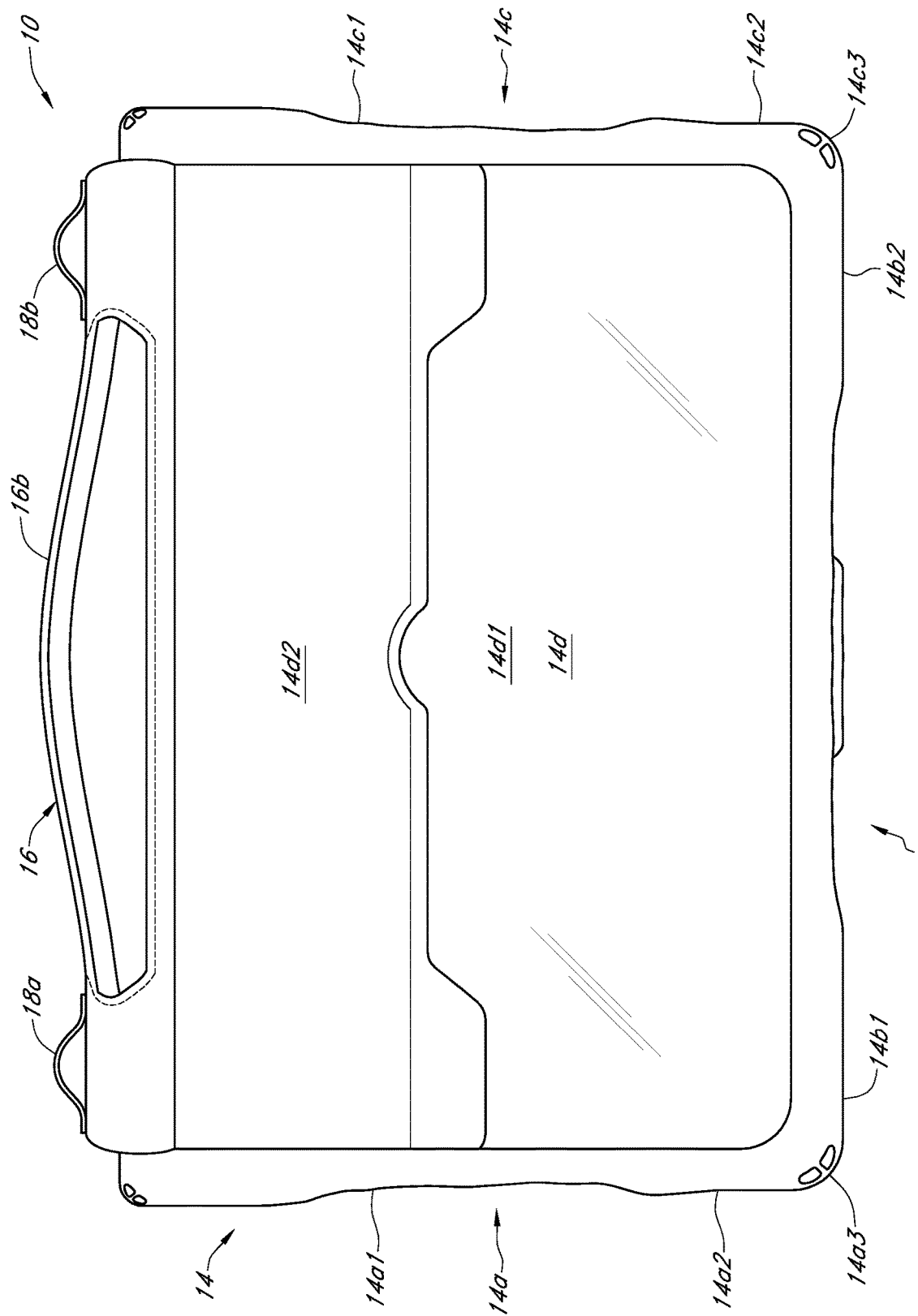
FIG. 4 is a front side-elevational view of device case assembly of FIG. 1 in closed configuration.

Turning to FIG. 4, depicted therein is a front side-elevational view of device case assembly of FIG. 1 in closed configuration.

Figure 5:
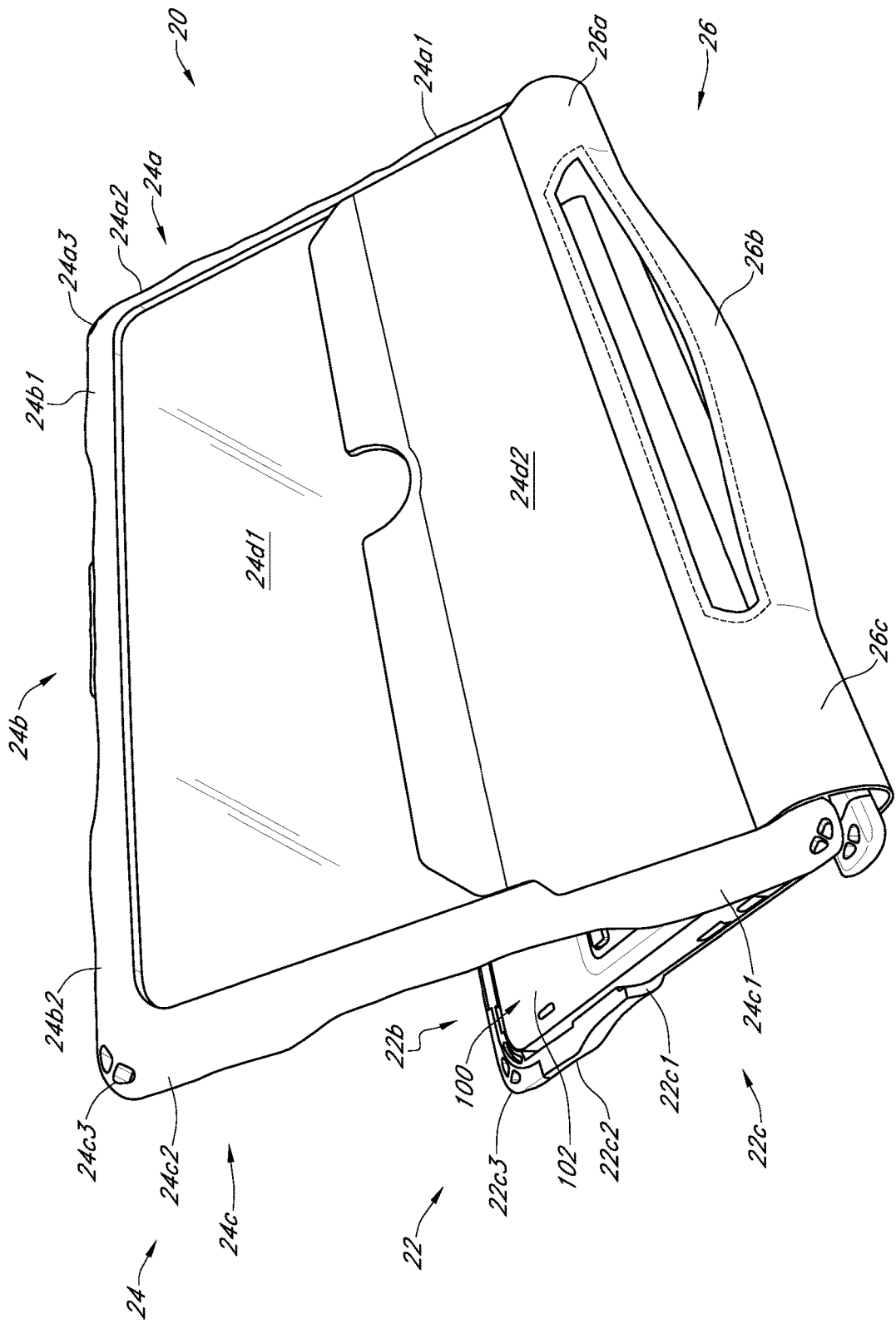
FIG. 5 is a rear perspective view of a device case assembly in partial open configuration.

Turning to FIG. 5, depicted therein is a rear perspective view of a device case assembly in partial open configuration. In implementations, device case assembly 20 is shown to include first case section 22, second case section 24, and spine member 26.

In implementations, first case section 22 is shown to include side 22b, and side 22c. In implementations, side 22c is shown to include device access 22c1, exterior portion 22c2, and exterior portion 22c3. In implementations, base 22d is shown to include uncovered base portion 22d1.

In implementations, second case section 24 is shown to include side 24a, side 24b, side 24c, and base 24d. In implementations, side 24a is shown to include exterior portion 24a1, exterior portion 24a2, and exterior portion 24a3. In implementations, side 24b is shown to include exterior portion 24b1, and exterior portion 24b2. In implementations, side 24c is shown to include exterior portion 24c1, exterior portion 24c2, and exterior portion 24c3. In implementations, base 24d is shown to include uncovered base portion 24d1.

In implementations, spine member 26 is shown to include spine portion 26a, spine portion 26b, spine portion 26c, elongated opening 26d, elongated opening 26e, spine portion 26f, spine portion 26g, and spine portion 26i.

In implementations, first case section 22 is shown to contain keyboard portion 102 of electronic device 100.

Figure 6:
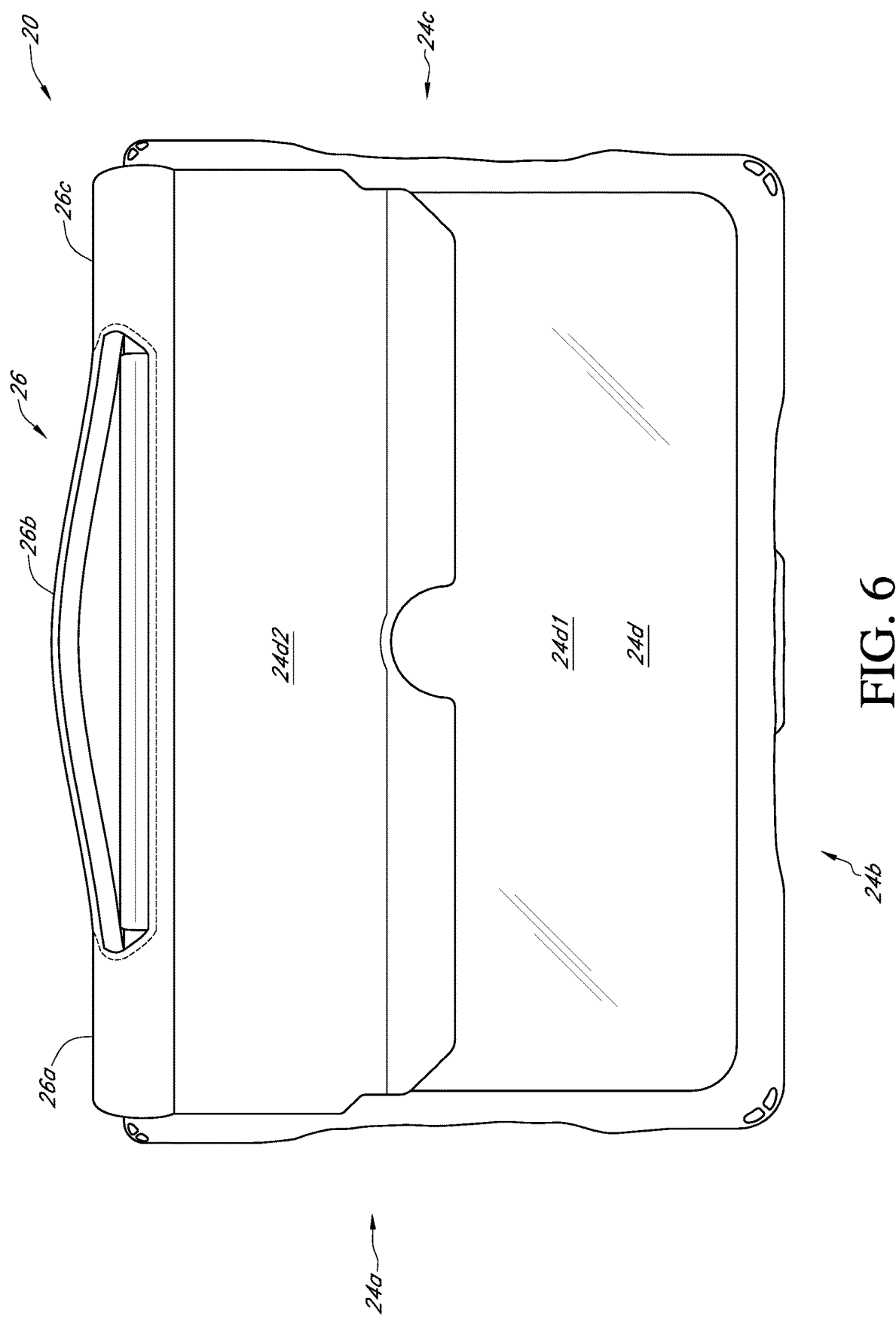
FIG. 6 is a front side-elevational view of device case assembly of FIG. 5 in closed configuration.

Turning to FIG. 6, depicted therein is a front side-elevational view of device case assembly of FIG. 5 in closed configuration.

Figure 7:
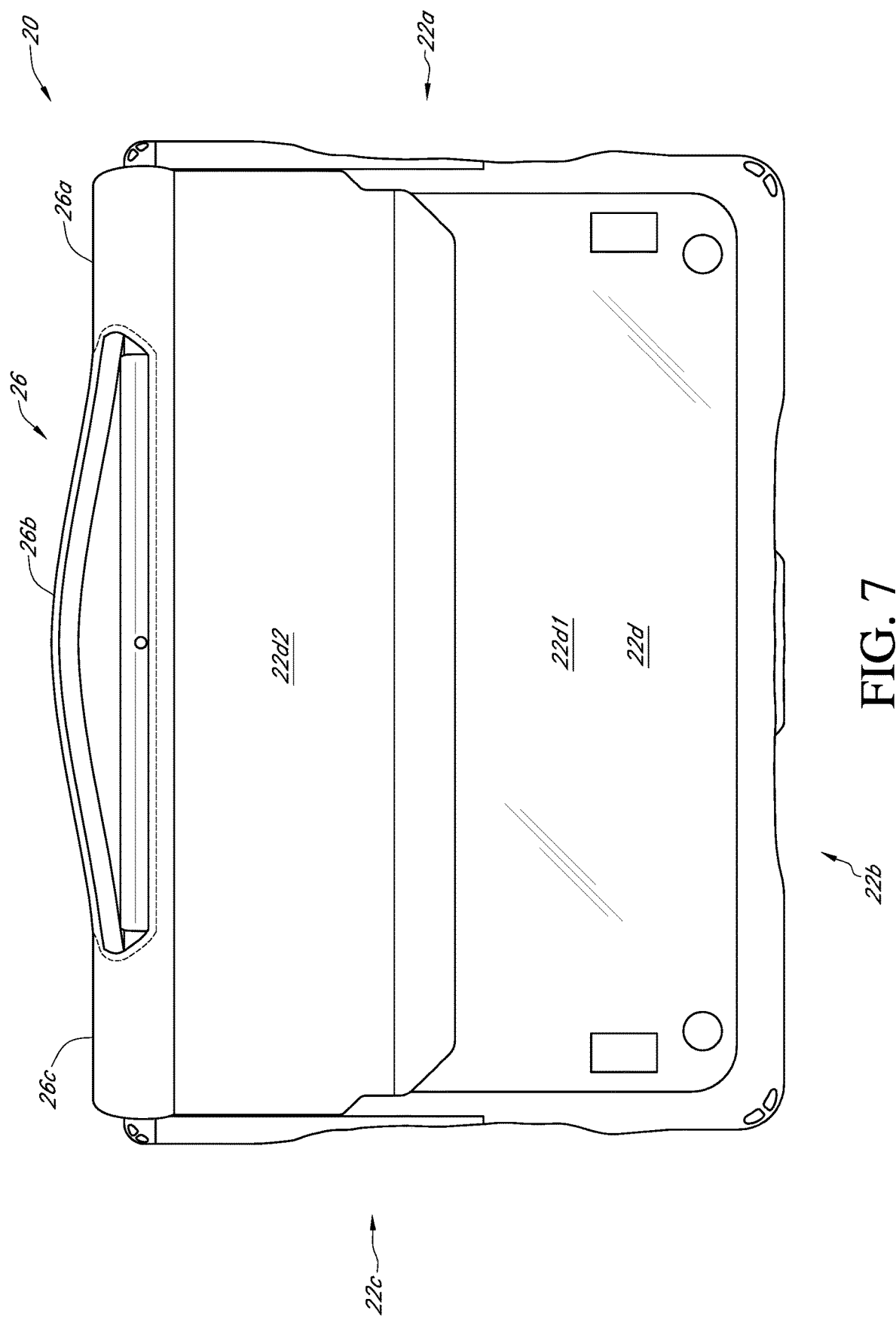
FIG. 7 is a rear side-elevational view of device case assembly of FIG. 5 in closed configuration.

Turning to FIG. 7, depicted therein is a rear side-elevational view of device case assembly of FIG. 5 in closed configuration. In implementations, first case section 22 is shown to contain side 22a. In implementations, spine member 26 is shown to contain spine portion 26h.

Figure 8:
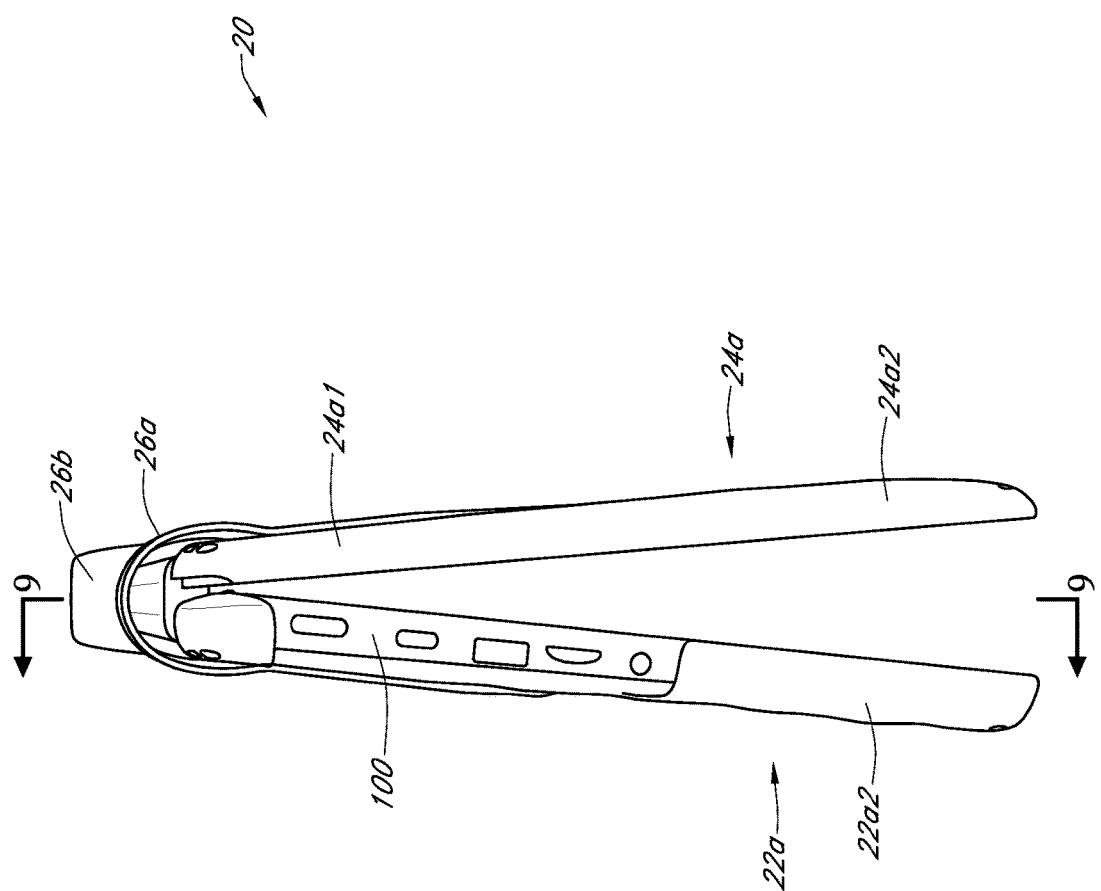
FIG. 8 is an end side-elevational view of device case assembly of FIG. 5 in partially open configuration.

Turning to FIG. 8, depicted therein is an end side-elevational view of device case assembly of FIG. 5 in partially open configuration. In implementations, side 22a is shown to contain exterior 22a2.

Figure 9:
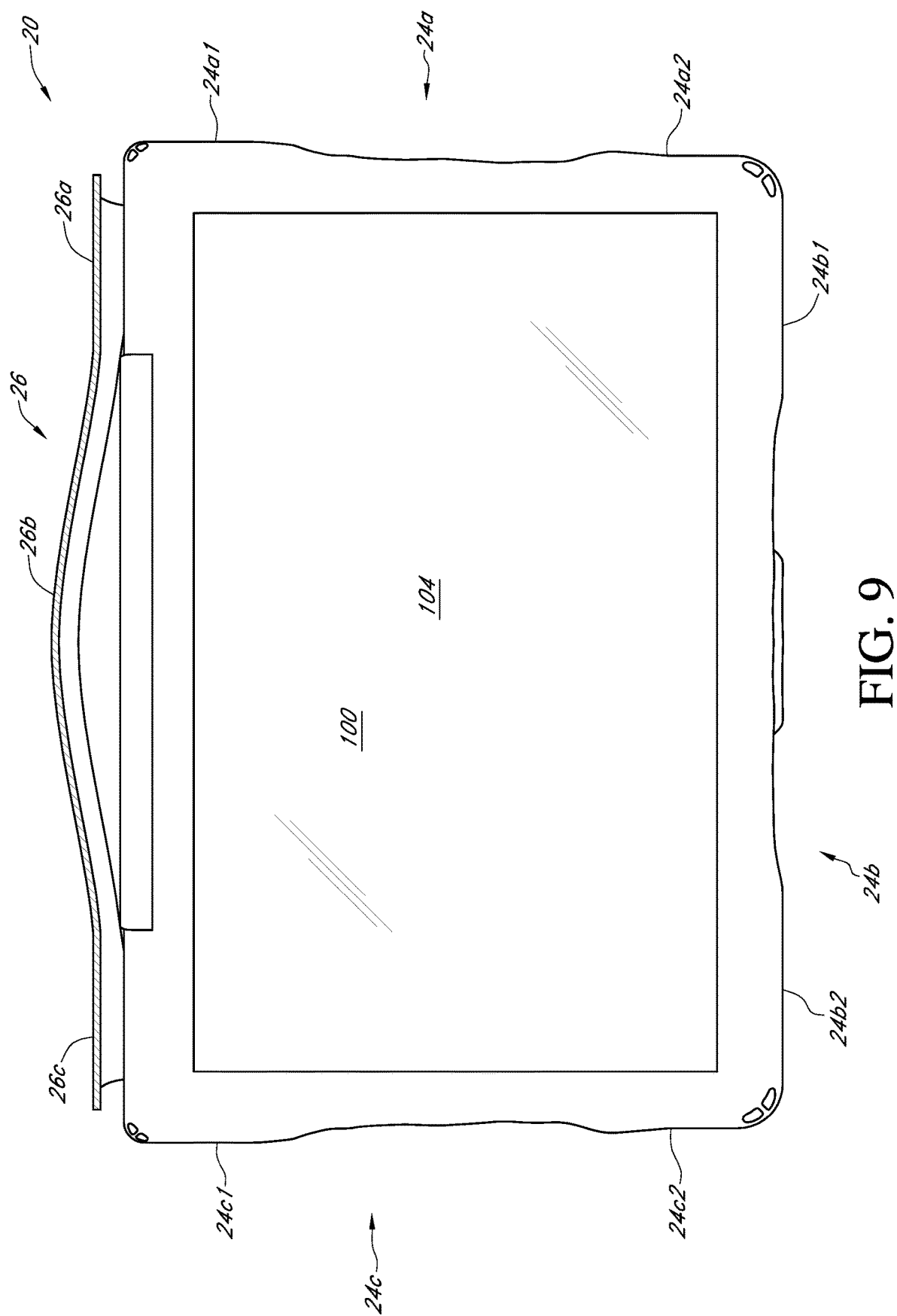
FIG. 9 is a cross-sectional view of device case assembly of FIG. 5 taken along the cut line 9-9 shown in FIG. 8.

Turning to FIG. 9, depicted therein is a cross-sectional view of device case assembly of FIG. 5 taken along the cut line 9-9 shown in FIG. 8. In implementations, second case section 24 is shown to contain display portion 104.

Figure 10:
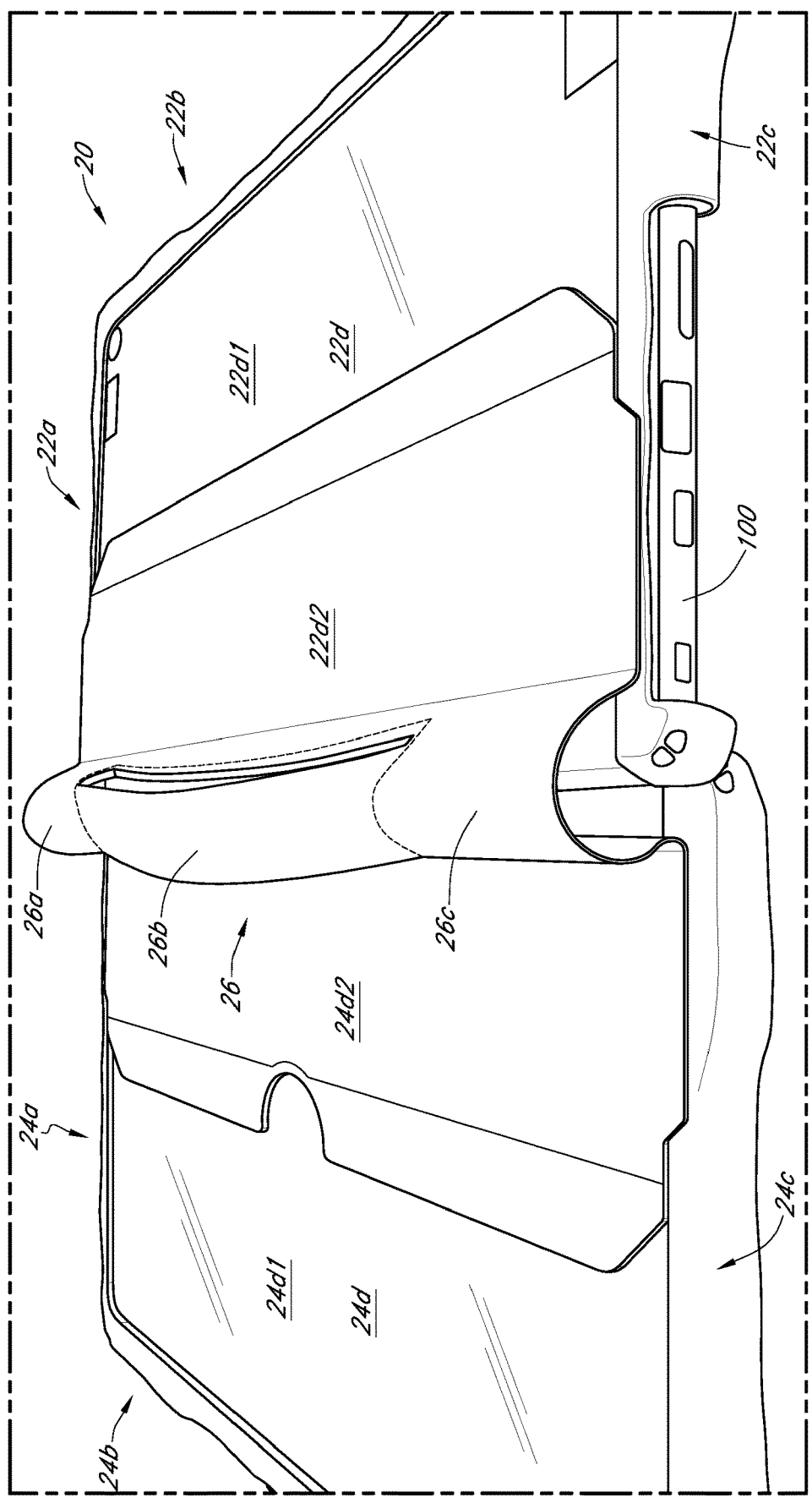
FIG. 10 is a rear perspective of the device case assembly of FIG. 5 in flat-open configuration.

Turning to FIG. 10, depicted therein is a rear perspective of the device case assembly of FIG. 5 in flat-open configuration.

Figure 11:
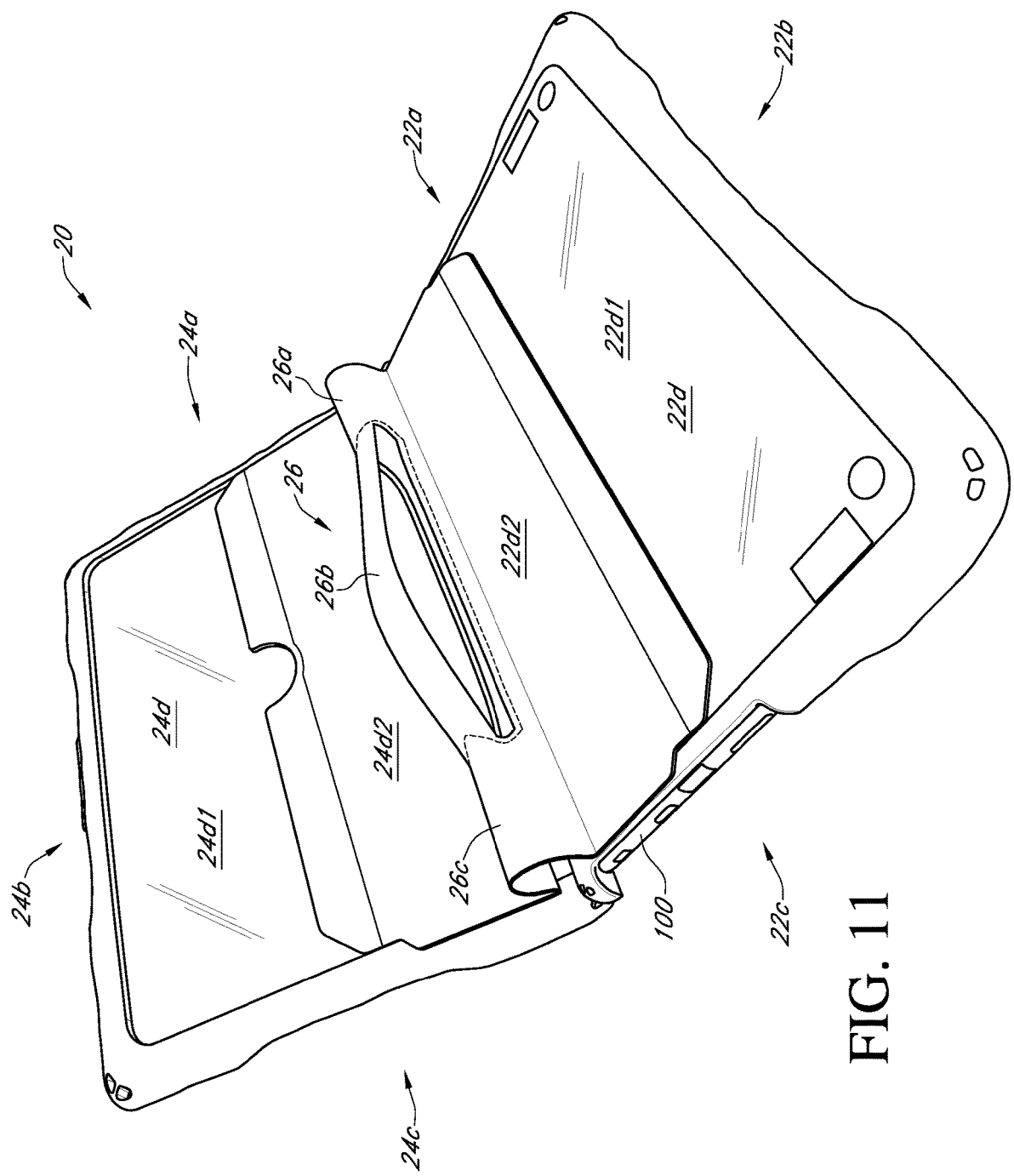
FIG. 11 is a rear perspective of the device case assembly of FIG. 5 in partially-folded-over-open configuration.

Turning to FIG. 11, depicted therein is a rear perspective of the device case assembly of FIG. 5 in partially-folded-over-open configuration.

Figure 12:
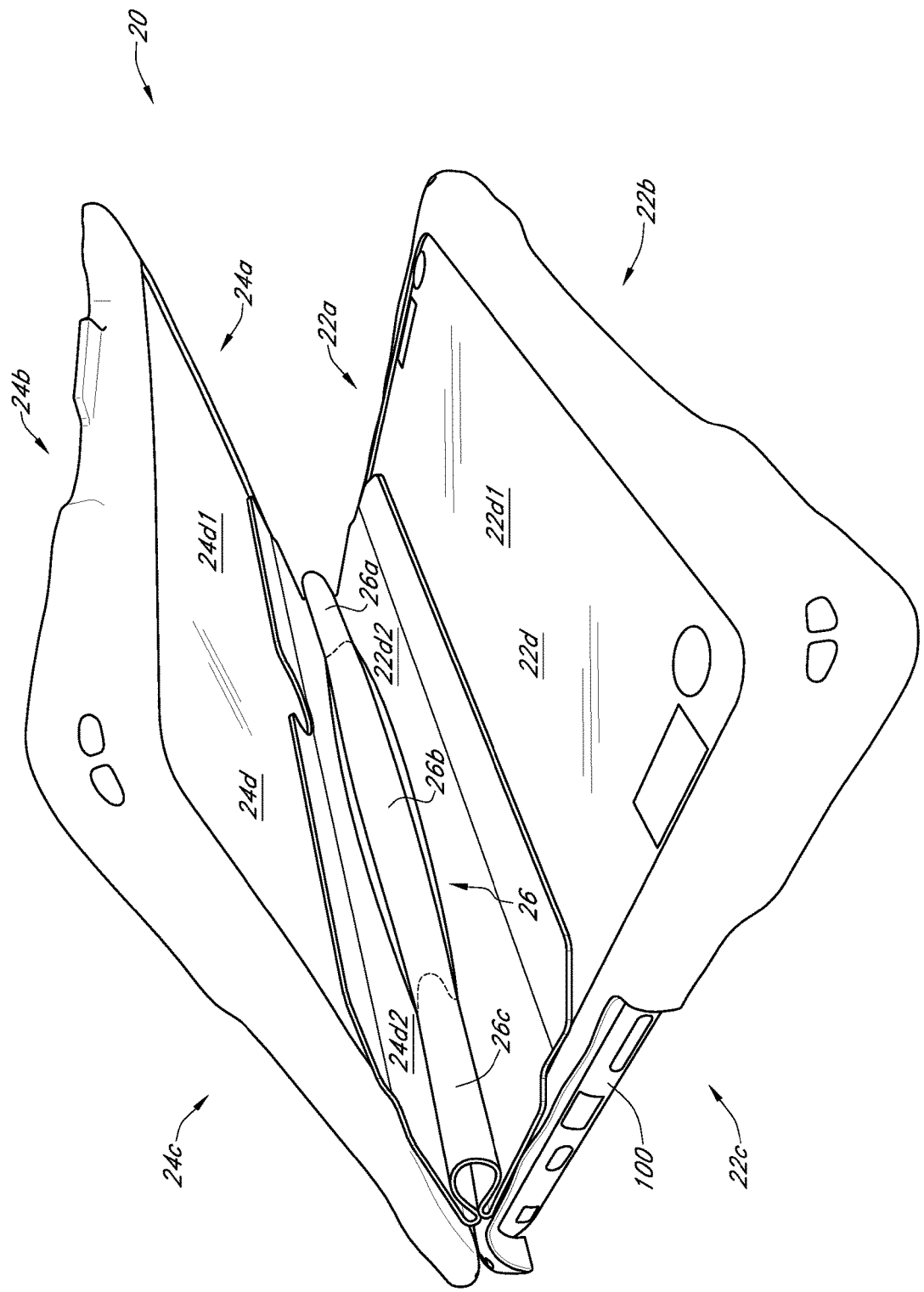
FIG. 12 is a rear perspective of the device case assembly of FIG. 5 in folded-over-open configuration.

Turning to FIG. 12, depicted therein is a rear perspective of the device case assembly of FIG. 5 in folded-over-open configuration.

Figure 13:
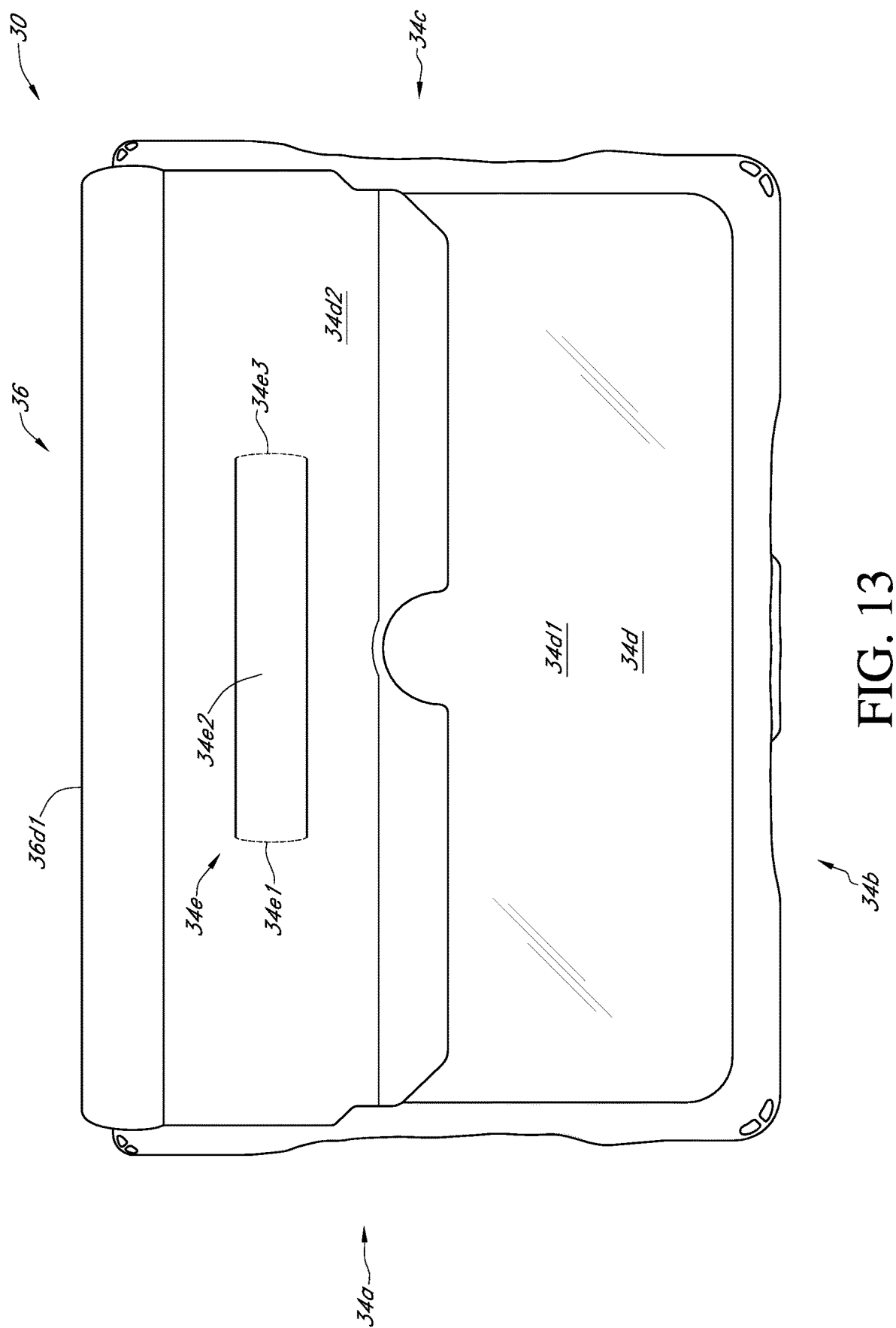
FIG. 13 is a front side-elevational view of device case assembly in closed configuration.

Turning to FIG. 13, depicted therein is a front side-elevational view of device case assembly in closed configuration. In implementations, device case assembly 30 is shown to include second case section 34, and spine member 36.

In implementations, second case section 34 is shown to include side 34a, side 34b, side 34c, base 34d, and handle assembly 34e.

In implementations, base 34d is shown to include uncovered base portion 34d1. In implementations, handle assembly 34e is shown to include handle end 34e1, handle member 34e2, and handle end 34e3.

In implementations, spine member 36 is shown to include spine portion 36d1, and spine portion 36i.

Figure 14:
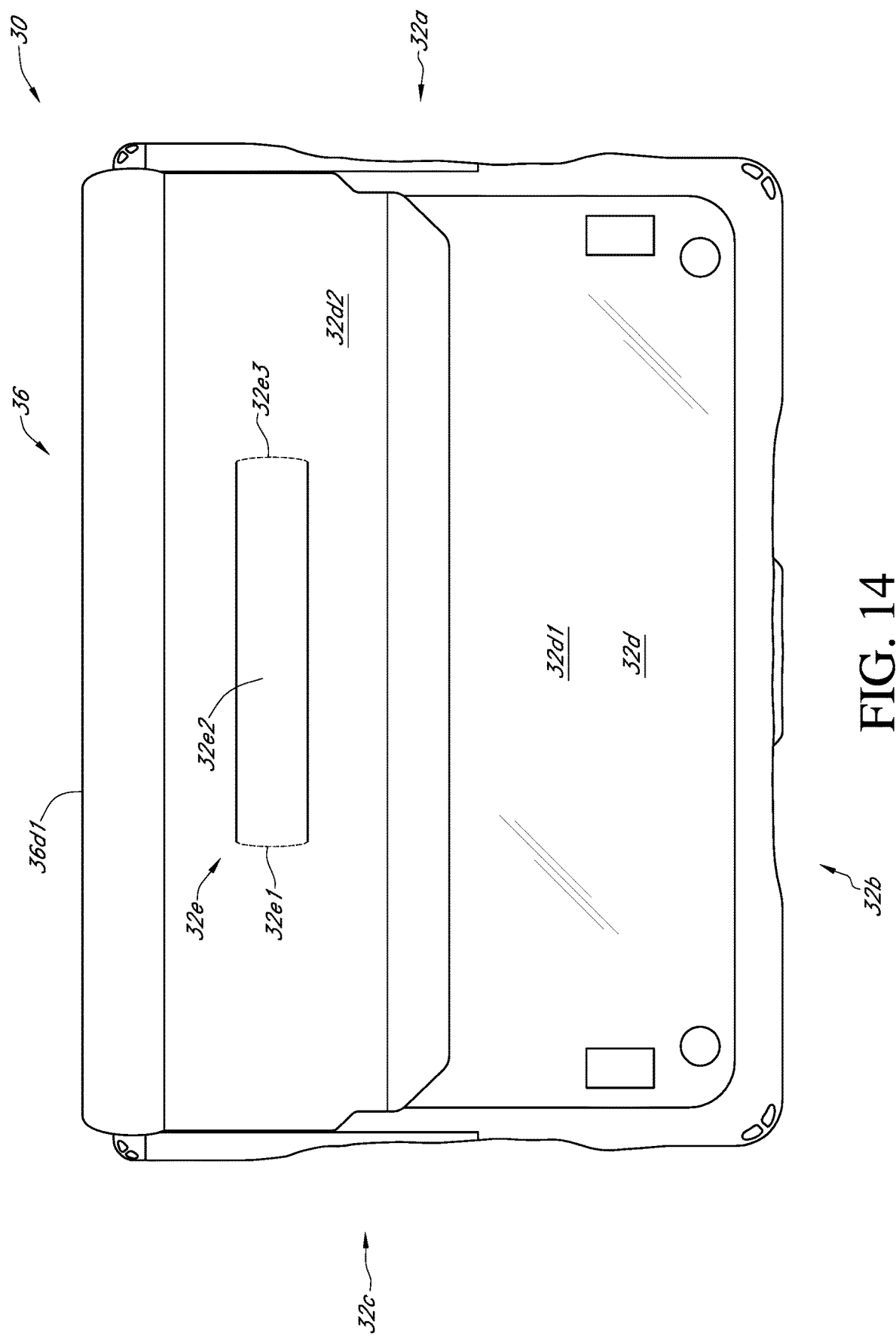
FIG. 14 is a rear side-elevational view of device case assembly of FIG. 13 in closed configuration.

Turning to FIG. 14, depicted therein is a rear side-elevational view of device case assembly of FIG. 13 in closed configuration. In implementations, device case assembly 30 is shown to include first case section 32.

In implementations, first case section 32 is shown to include side 32a, side 32b, side 32c, base 32d with uncovered base portion 32d1, and handle assembly 32e with handle end 32e1, hand member 32e2, and handle end 32e3. In implementations, spine member 36 is shown to include spine portion 36h.

Figure 15:
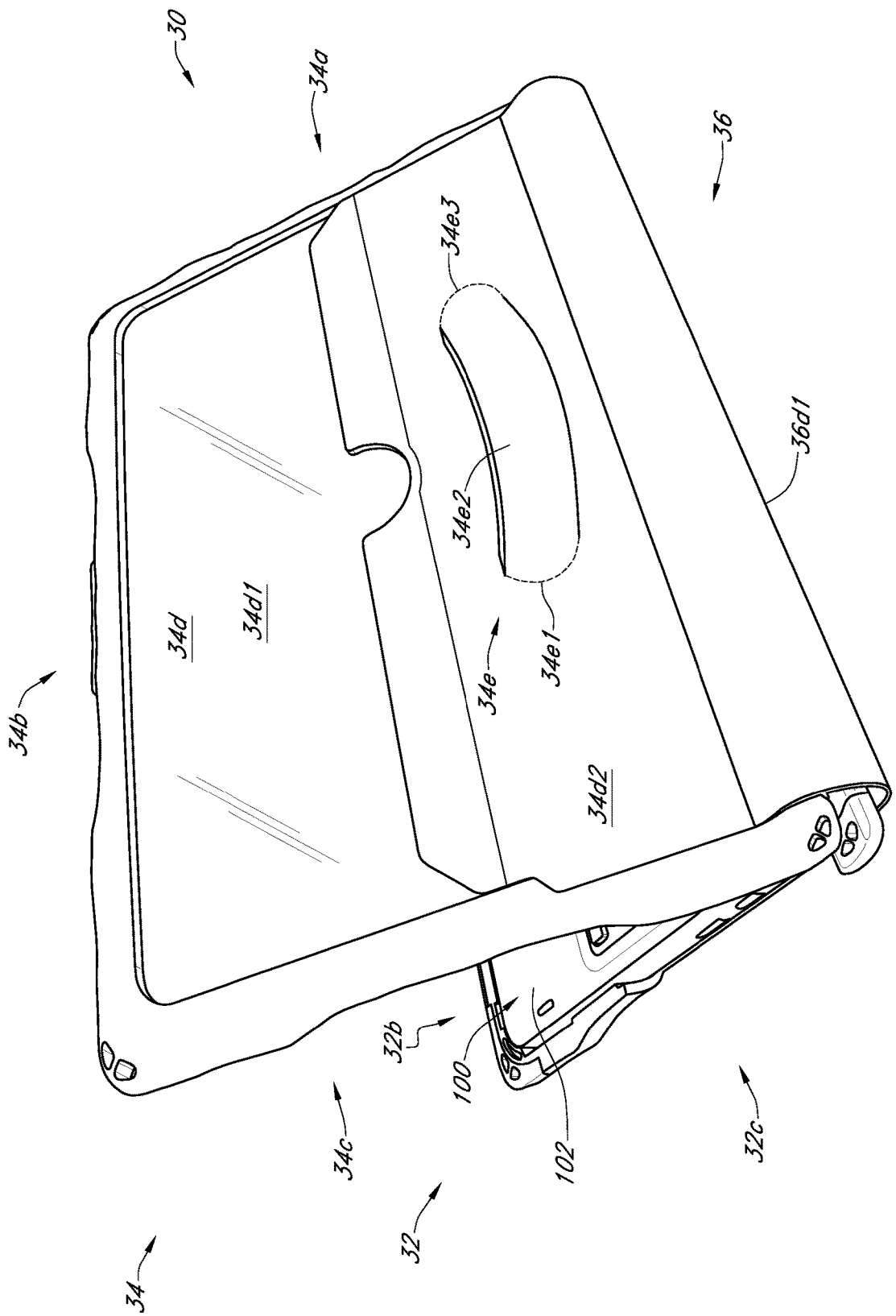
FIG. 15 is a rear perspective view of device case assembly of FIG. 13 in partial open configuration.

Turning to FIG. 15, depicted therein is a rear perspective view of device case assembly of FIG. 13 in partial open configuration.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a portable electronic computing device, the portable electronic computing device including a first device portion, and a second device portion, wherein the first device portion being at least one of the following: hingedly couplable with the second device portion and separately uncouplable from the second device portion, the system comprising:
   (I) a first case section including
      (A) a base including at least one interior surface,
      (B) a first side including at least one first wall portion with the at least one first wall portion extending perpendicularly to the at least one interior surface,
      (C) a second side including at least one second wall portion with the at least one second wall portion extending perpendicularly to the at least one interior surface, and
      (D) a third side including at least one third wall portion with the at least one third wall portion extending perpendicularly to the at least one interior surface,
      wherein the at least one first wall portion extends perpendicularly to the second wall portion, and
      wherein the at least one first wall portion extends parallel with the at least one third wall portion such that
      the first case section being configured to receive the first device portion of the portable electronic computing device;
   (II) a second case section including
      (A) a base including at least one interior surface,
      (B) a first side including at least one first wall portion with the at least one first wall portion extending perpendicularly to the at least one interior surface,
      (C) a second side including at least one second wall portion with the at least one second wall portion extending perpendicularly to the at least one interior surface, and
      (D) a third side including at least one third wall portion with the at least one third wall portion extending perpendicularly to the at least one interior surface,
      wherein the at least one first wall portion extends perpendicularly to the second wall portion, and
      wherein the at least one first wall portion extends parallel with the at least one third wall portion such that
      the second case section being configured to receive the second device portion of the portable electronic computing device; and
   (III) a spine member being coupled to the first case section, the spine member being coupled to the second case section,
      (A) the spine member including a first elongated spine member portion extending further in a first direction parallel to the at least one second wall portion of the first case section than extending in a second direction perpendicular to the at least one second wall portion of the first case section,
      (B) the spine member including a first elongated opening and a second elongated opening positioned on either side of the first elongated spine member portion, the first elongated opening and the second elongated opening extending further in the first direction parallel to the at least one second wall portion of the first case section than extending in the second direction perpendicular to the at least one second wall portion of the first case section,
         (i) the first elongated opening being positioned closer to the first case section than the second elongated opening is positioned to the first case section, and
         (ii) the second elongated opening being positioned closer to the second case section than the first elongated opening is positioned to the second case section.

2. The system of claim 1 wherein the at least one first wall portion of the first side is spaced from the at least one third wall portion of the third side a first distance along the first direction parallel to the at least one second wall portion of the first case section, and
   wherein elongated opening of the spine member includes a first elongated opening and a second elongated opening, an elongated spine member portion therebetween, the first elongated opening, the second elongated opening, and the first elongated spine member portion being extended at least a third of the first distance along the first direction parallel to the at least one second wall portion of the first case section.

3. The system of claim 1 wherein the first case portion, the second case portion, and the spine member being of at least one molded material structure.

4. The system of claim 1 wherein the first case portion being of at least one first material substance, the second case portion being of the at least one first material substance, and the spine member being of at least one second material substance, the first case portion, the second case portion, and the spine member being formed by co-molding.

5. The system of claim 1 wherein the first case portion being of at least one first material substance, the second case portion being of the at least one first material substance, and the spine member being of at least one second material substance.

6. The system of claim 1 wherein the spine member being made from material to allow for change in width of at least one portion of the first elongated opening and at least one portion of the second elongated opening.

7. The system of claim 1
wherein the spine member includes at least one interior surface,
wherein a first configuration of the system includes the at least one interior surface of the base of the first case section, the at least one interior surface of the base of the second case section, and the at least one interior surface of the spine member being planarly parallel with each other, and
wherein the first configuration of the system includes a width of the at least one portion of the first elongated opening and the second elongated opening being generally consistent along the at least one portion of the at least one elongated opening.

8. The system of claim 1 wherein the spine member includes at least one first width and the first elongated opening and the second opening include at least one second width, the at least one first width being greater than the at least one second width.

9. The system of claim 1 wherein the spine member includes at least one first width and the first elongated opening and the second elongated opening includes at least one second width, the at least one first width being smaller than the at least one second width.

10. The system of claim 1,
wherein the spine member including at least one portion extending between the first case section and the second case section,
wherein the at least one portion of the spine member extending along the linear dimension a first length, and wherein includes a least a portion of the first elongated opening and the second elongated opening extending generally parallel with the linear dimension a second length, the second length being at least half of the first length.

11. The system of claim 1, wherein the first elongated opening and the second elongated opening have first and second sides extending generally parallel with the second wall portion of the first case section linear dimension, the first side of the first elongated opening and the second elongated opening including a first length and the second side of the first elongated opening and the second elongated opening including a second length, the first length being greater than the second length.

12. The system of claim 1,
wherein the spine member includes a first surface portion and a second surface portion,
wherein the first surface portion of the spine member being in contact with at least a portion of one of the at least one interior surface of the first case section, and
wherein the second surface portion of the spine member being in contact with at least a portion of one of the at least one interior surface of the second case section.

13. The system of claim 1, wherein the spine member includes at least one fabric-based material.

14. The system of claim 1 wherein at least one portion of the spine member is made of a flexible synthetic material selected from a list including but not limited to metalized material, acrylonitrile material (ABS), low density polyethylene (LDPE) material, flexible plastic material, polyvinyl chloride material, thermoplastic polyurethane material, and silicone material.

15. The system of claim 1 wherein at least one portion of the first case section and at least one portion of the second case section are made of a hard material selected from a list including but not limited to high-density polyethylene (HDPE) plastic.

* * * * *